United States Patent Office 3,235,613
Patented Feb. 15, 1966

3,235,613
PROCESS FOR THE PRODUCTION OF
1,5,9-CYCLODODECATRIENES
Seymour J. Lapporte, Berkeley, Calif., assignor to Chevron Research Company, a corporation of Delaware
No Drawing. Filed Jan. 9, 1963, Ser. No. 250,219
7 Claims. (Cl. 260—666)

This invention relates to an improved process for the production of 1,5,9-cyclododecatrienes by contacting 1,3-conjugated dienes in the presence of new cyclotrimerization catalysts.

It is known to catalytically cyclotrimerize 1,3-conjugated dienes, but the prior art catalysts have a number of shortcomings, including involved preparation procedures, the use of toxic materials, such as phospines and metal carbonyls, and of complex organometallic compounds, such as mixed alkyl halide and mixed alkyl alkoxide organometallic compounds.

It has now been found that 1,5,9-cyclododecatrienes may be produced by contacting at a temperature in the range from about 0° C. to 200° C. under autogenous pressure, low molecular weight 1,3-conjugated diene hydrocarbons in the presence of a catalyst obtained by reacting in the ratio of 1 formula weight of a nickel salt of an acidic organic compound having a pKa in the range from about 1–20, and containing 1–2 acidic hydrogen atoms in a unreactive carbon skeleton, from 1–25 carbon atoms per molecule and only carbon, hydrogen and oxygen, with from 1 to 6 mols of a Mendelyeev Periodic Table Group III organometallic compound in which the organic component contains from 1–8 carbon atoms per hydrocarbon radical group and the metal has an atomic number below 14.

After the contacting of the conjugated diene with the catalyst material, the resulting cyclododecatrienes are recovered by conventional means.

Once prepared, the preferred catalysts are stable for long periods of time, being capable of storage and reuse or continued use without excessive loss of activity, so long as acidic- and Lewis-base-type materials are excluded. In the preferred form, the catalysts of the present invention are stable, nonpyrophoric sols which do not settle even on long standing and present an exceptionally high surface area per unit of catalyst for use in the cyclotrimerization reactions. Selectivity for the desired cyclotrimerization of conjugated dienes may be essentially quantitative.

The actual chemical structure of the catalyst complex of the present invention is not known.

When 4 mols of a trialkyl or triaryl aluminum, for example, triethyl aluminum or triphenyl aluminum, are added to one formula weight of a nickel-(2) salt, for example, 2-ethylhexanoate, a highly selective and active diene cyclotrimerization catalyst results. A chemical reaction takes place as generally evidenced by evolution of heat of reaction and the formation of hydrocarbon by-product.

For the preparation of effective catalysts for use in the present invention, particular ratios of amounts of the nickel organic acid salts and the organometallic compound must be used. This is shown by a selectivity test wherein the catalyst composition is related to the relative amount of the cyclotrimer produced from the charged and consumed conjugated diene feed. Thus, at a ratio of 1:1, the selectivity is only about 0.18. Similarly, when the ratio is 6:1, the selectivity is only 0.2. Satisfactory catalysts may be prepared using a ratio of organometallic compound to nickel salt in the range 2–5 to 1. The particularly preferred range is 2.5–4.5 to 1. At ratios above about 8:1, the selectivities are in general zero for all practical purposes. Selectivities of the preferred catalyst composition vary in the range from about .6 to about .95.

The catalyst compounds and the diene may be charged individually into the reaction zone with or without an inert hydrocarbon diluent, such as acyclic and alicyclic alkanes, alkenes, aromatic hydrocarbons, inertly substituted benzenes, such as alkylbenzenes. Representative inert diluents are benzene, toluene, chlorobenzene, t-butylbenzene, white oils, hydrocarbon wax, pentane, heptane, cyclododca trienes, i.e., in the reaction products and hydrocarbon mixtures. Preferably and advantageously, the catalyst is prepared in advance of use, although this is not necessary because the components react rapidly, even at moderate temperatures, i.e., from about 0°–100° C., as well as at reduced and elevated temperatures, i.e., from about −50° to 200° C. and higher, but below the well known thermal decomposition temperature of the nickel salt.

In the presence of the catalyst and over a wide range of pressures, reduced, atmospheric and superatmospheric, but preferably under autogenous pressure, low molecular weight, dienes, for example, 1,3-butadiene, 2-methylbutadiene, 1,3-pentadiene, 2,3-dimethylbutadiene, 2-chloro-1,3-butadiene, 2-phenyl-1,3-butadiene, that is, acyclic 1,3-dienes having from 4 to 10 carbon atoms, and at a temperature in the range from about 0° C. to 200° C., yield the corresponding substituted and unsubstituted 1,5,9-cyclododecatrienes. The preferred feeds are butadiene and methyl-substituted butadienes because, as the diene molecular weight is increased, cyclotrimerization reaction rates appear to be less practicable. At about 40° C. an appreciable reaction rate is experienced which improves with increasing temperatures. At temperatures above about 175° C., and especially so at 200° C., an uncatalyzed by product forming thermal dimerization reaction seriously competes for the diene feed. Preferred reaction temperatures are in the range from about 75° to 150° C.

The nickel salts useful in the preparation of the trimerization catalyst must be salts of acidic organic compounds. In general, organic acids having pKa values, as measured in a hydrocarbon medium, in the range 1–20 form satisfactory nickel salts for use in the catalyst preparation. Preferably, the acid is composed of only carbon, hydrogen, and oxygen, and contains one or two acidic hydrogen atoms. One or more hydrogen atoms may be replaced by inert substituent groups, such as essentially covalent bonded chlorine and the like, i.e., groups which do not react with the organometallic compound used in the catalyst preparation, but no particular advantage is obtained by use of the more costly nickel salts of such substituted acids.

The preferred nickel salts are salts of monobasic strongly acidic organic acids having pKa's (hydrocarbon medium) in the range from about 1 to 8. In general, these acids are carboxylic and will have in an unreactive carbon skeleton from about 1 to 25 carbon atoms, although some minor variation in the limits is to be noted, depending upon whether the unreactive carbon skeleton is (1) acyclic and branched or straight chain, alkyl, alkenyl, and the like, or (2) cyclic and cycloalkyl, cycloalkenyl, alkylaryl, and combinations thereof. Nickel salts of the above acids yield exceptional catalysts in the form of disperse sols of high activity and selectivity per unit of catalyst.

Included among the nickel salts of the preferred strongly acidic organic acids are the salts of the acids: 2-ethylhexanoic, 2 - methylpentanoic, 2 - ethylpentanoic, naphthenic, octanoic, 2-methyloctanoic, pelargonic, decanoic, 2-methyldecanoic, undecylenic, undecylic, oleic, hydrocinnamic, lauric, myristic, palmitic, phenylacetic, 2-methylpentadecylic, pentadecylic, erucic, hexylcyclohexanecarboxylic, butylbenzoic, butylcyclohexanecarboxylic, 2-ethyloctanoic, ethylbenzoic, β-butylnaphthoic, 2-methylstearic, and the like. Where the structure of the acid is complex containing branching and cyclic variations as, for example, in naphthenic acid, the carbon atom content may be as high as 25 carbon atoms and even higher, and yet the nickel salt will be hydrocarbon soluble. As a practical matter, no particular advantage appears to result from the use of $C_{26}$ and higher molecular weight acid salts.

Additional desirable nickel salts for use in cyclotrimerization catalyst preparation are the nickel salts of mono- and dibasic carboxylic acids, such as benzoic, formic, acetic, oxalic, propionic, butyric, maleic, malonic, adipic, succinic, crotonic, carboni, isobutyric, stearic, nonadecanoic, n-$C_{25}H_{51}CO_2H$, glutaric, salicyclic, naphthoic, phthalic, azelaic, suberic, pimelic, methylsuccinic, valeric, and the like.

Particularly preferred for catalyst preparation are the nickel salts of strongly acidic organic acids which are soluble in the inert organic medium of choice to some appreciable degree, i.e., of the order of about 0.1 weight percent and higher based upon the medium. In general, these salts will be those of organic acids having from about 6 to 25 carbon atoms per inert hydrocarbon skeleton and these limits can vary in some degree depending upon well known solubility considerations relative to the inert medium type such as aromatic hydrocarbon, and alkane or alkene and the degree of the branching in the hydrocarbon skeletons thereof and of the nature of the hydrocarbon skeleton of the nickel salt anion. The hydrocarbon or inert medium soluble nickel salts are most preferred, because of substantial advantages experienced in their use in catalyst preparation such as their practically instantaneous reaction with the added organometallic compound to yield active catalysts, the convenience in handling of solutions thereof and the superior catalysts which they yield. Thus, while medium insoluble nickel salts of organic acids upon reaction with the required amount of the organometallic compound generally yield active but partially agglomerated catalyst sols, the catalysts obtained from the medium soluble salts are stable sols of extremely fine division generally capable of remaining dispersed even in ultrahigh centrifuge force fields such as one generated at 60,000 r.p.m. for long periods.

Less desirable than the nickel salts of strong acidic organic acids, but nonetheless useful for conjugated diene cyclotrimerization catalyst preparation are the nickel salts of weakly acidic organic acids having pKa values (hydrocarbon medium) in the range from about 9–20, having from 1 to about 25 carbon atoms, 1–2 active acidic hydrogen atoms, an unreactive hydrocarbon skeleton, i.e., no 1,3-conjugated diene structure, and containing only carbon, hydrogen, and oxygen. As in the case of the strong acids, the nickel salts of inertly substituted weak acids may also be used, but such are not generally advantageous. Similarly, the useful unreactive carbon-skeleton types of the weak acids includes those enumerated for the acids above. Included among nickel salts of the weak acids contemplated are those of the carbinols, such as methanol ($Ni(O-CH_3)_2$), butanol, hexyl alcohol, 2-ethylhexanol, lauryl alcohol, stearyl alcohol, $C_{25}H_{51}OH$, octyl alcohol, cyclohexanol, octanol, isobutanol, eicosanol, oleyl alcohol, octadecenol, phenol, laurylphenol, t-butylphenol, naphthol, glycol, n-$C_{10}H_{21}CHOHCH_2OH$, and of the β-diketones, such as acetylacetonate, and higher molecular weight analogs of acetylacetonate, and the like. The nickel salts of weak organic acids are less desirable for a number of reasons, including, in general, the relative difficulty in preparation in the required anhydrous salt form, susceptibility of most of these nickel salts to hydrolysis, tendency to form an agglomerated trimerization catalyst, and the like.

The organometallic component of the catalyst is preferably a Periodic Table Group III metal trialkyl, triaryl, mixed alkyl, aryl and combinations of these groups with 1 or 2 hydride groups. Groups I and II orgnaometallic compounds are less desirably employed; their metal hydrides being essentially insoluble in hydrocarbon media, causing problems in solids handling and solubilization, are similarly less desirable.

Organometallic compounds containing a Group III metal element are preferred because of their ability to form stable complexes to which might be attributed the remarkable stability of the catalyst. Particularly preferred are the Group III elements having atomic numbers below 14. Representative compounds are trimethyl aluminum, triethyl aluminum, triisobutyl aluminum, triphenyl aluminum, phenyldiethyl aluminum, diisobutyl aluminum hydride, and the analogous alkyls and aryl compounds of boron, gallium, indium, and the like. Higher molecular weight, hydrocarbon radicals as alkyl, aryl, cycloalkyl, aralkyl, and even alkenyl, alkynyl groups than those indicated may be used; that is they may have as many as 8 carbon atoms per group, and higher.

The amount of catalyst which can be used can vary. Even trace amounts exhibit detectable activity. As a practical matter, and because cyclotrimerization is a high-order reaction involving at least three molecules of diene and a catalyst substrate, large amounts of catalyst relative to the monomer are desirably used. A further advantage resulting from the use of relatively larger amounts of catalyst, especially in a continuous process arrangement, is the minimizing of the possible concurrent thermal dimerization which yields undesirable by-product. Similarly, the maintenance of a substantial monomer concentration in the reaction zone during the reaction is desirable.

While the catalyst preparation and cyclotrimerization may be carried out in the absence of an inert medium, preferably these steps either individually or simultaneously are carried on in an inert medium wherein the catalyst comprises from about 0.1 to 10 weight percent of the medium. With increasingly higher catalyst concentration, and depending upon the particular medium employed, agglomeration can become a problem.

The following examples further illustrate the invention:

EXAMPLE 1.—NICKEL SOL CATALYST PREPARATION

In a previously dried reaction zone essentially freed of molecular oxygen and under an inert nitrogen atmosphere was placed an approximately 3 weight percent solution of essentially anhydrous nickel 2-ethylhexanoate in anhydrous n-pentane. Triethyl aluminum in the ratio of 3.7 mols per gram atom of nickel salt was then added incrementally over a short period of time. A rapid reaction occurred yielding ethane in the ratio of 4 mols for each gram atom of nickel and a stable nonpyrophoric black sol. This catalyst is found to have a butadiene cyclotrimerization selectivity of at least .8 and to be of excellent activity. Physical measurements of the prepared catalyst with a variety of chemical agents indicated that the aluminum atoms were firmly bound to the nickel salt. When triphenyl aluminum, triisobutyl aluminum, tri-n-hexyl aluminum, and triethyl boron were used in the catalyst preparation in the proper proportions, similar effective diene cyclotrimerization catalysts were obtained.

EXAMPLE 2.—CATALYST PREPARATION USING HYDROCARBON INSOLUBLE NICKEL SALTS

In the preparation of cyclotrimerization catalysts using hydrocarbon insoluble nickel salts (cf. Runs 5, 9, 11, 17, 18, 19 of Table I), the anhydrous nickel salt in finely divided powder form was slurried in an inert hydrocarbon, i.e., n-pentane or toluene, in a reaction zone under conditions analogous to Example 1 and the organometallic compound added. As in the case of Example 1, reaction occurs, but slowly, and a black product results, including some sol and an appreciable amount of a black sludge or agglomerate, both of which have substantial diene cyclotrimerization activity. In their use it is desirable to employ an efficient stirring means.

EXAMPLE 3

Catalyst preparations were carried out in a manner analogous to Example 1, except that the corresponding chromium, manganese, copper, and cobalt salts were substituted for the nickel salts. Negligible or no cyclotrimerization activity resulted. This is indicative of the critical balance required between the metal cation, relative amount of organometallic component, and the associated organic anion for effective diene cyclotrimerization catalysts.

EXAMPLE 4

Catalyst preparations were carried out in a manner analogous to Example 1, except that catalytic quantities of tetrohydrofuran, dimethylsulfoxide, and nitrobenzene were added. Only thermal noncatalytic dimerization was observed. When triphenylphosphine was added in similar amounts, the product was substantially 1,5-cyclooctadiene, 74 percent, and the thermal dimerization product vinylcyclohexene, 21%, plus 5% of higher boiling material containing some cyclododecatriene. These experiments are indicative of the critical sensitivity of the instant catalyst towards Lewis-base-type compounds.

EXAMPLE 5

As in Example 1 and in an analogous manner, except that for the carboxylate anion of the nickel salt, there was substituted chloride, phosphate, cyanide, catalyst preparations were attempted. The resulting materials were black agglomerates or sludges which exhibited little or no diene cyclotrimerization activity, with the product recovered being mainly that from thermal dimerization, vinylcyclohexene. In the case of nickel cyanide, not even the thermal cyclodimer resulted.

Similarly, when nickel carbonyl was used in place of nickel 2-ethylhexanoate, only a trace, less than 0.5 percent, of cyclododecatriene was produced.

These examples indicate the critical requirement of the carboxylate-type acidic anion of the nickel salts in the preparation of the instant diene cyclotrimerization catalysts.

EXAMPLE 6

To a 300 ml. Monel rocker bomb containing 20 ml. of toluene having dissolved therein 0.003 formula weight of nickel 2-ethylhexanoate and under a nitrogen atmosphere was added 0.012 mol of triethyl aluminum. Thereafter, 78 grams (1.4 mols) of butadiene were added and the temperature raised to 100° C. and maintained at this temperature for 24 hours under autogenous pressure and with stirring. The product mixture was then removed from the reactor and deactivation and separation of the catalyst from the product was effected by steam distillation. Product analysis was accomplished by the use of gas-liquid partition chromatography using appropriate standards.

Results

Conversion, percent _____ 95
Non-volatiles, percent of converted feed _____ 3.5
Volatiles, composition:
  1,5,9-cyclododecatriene _____ 83
  4-vinylcyclohexene _____ 11
  Other _____ 6

EXAMPLE 7

As in Example 6, the examples listed in Table I were run, except that the variations in feed and conditions as indicated were made.

In some instances a stainless steel (316) autoclave fitted with a mechanical stirring means was used. The difference in materials of construction had no noticeable effect upon the runs, but improved mixing was beneficial.

TABLE I

| Run No. | Catalyst | | | | | Medium | Charge butadiene, g. | Conditions | | Conversion, percent | Product | | | |
|---|---|---|---|---|---|---|---|---|---|---|---|---|---|---|
| | Nickel, gram atoms | Anion | Organometallic compound, mols | Metal constituent | Hydrocarbon radical | | | Temp., °C. | Time, hrs. | | Steam distillable, percent | Cyclododecatri-(1,5,9)-enes | 4-vinylcyclohexene | Other |
| 1 | 0.003 | (a) | 0.012 | Al | Ethyl | φCH₃ | 78 | 100 | 24 | 95 | 96.5 | 83 | 11 | 6 |
| 2 | 0.003 | (a) | 0.012 | Al | ___do___ | φCH₃ | 76 | 130–206 | 10 | 99 | 88 | 51 | 40 | 9 |
| 3 | 0.003 | (a) | 0.012 | Al | ___do___ | φCH₃ | 91 | 150 | 7 | 99 | 92 | 76 | 16 | 8 |
| 4 [1] | 0.005 | (a) | 0.015 | Al | ___do___ | φCH₃ | 79 | 110 | 24 | 64 | | | | |
| 5 | 0.015 | (b) | 0.045 | Al | ___do___ | C₅H₁₂ | 90 | 80 | 9.5 | 98 | 92 | 86 | 8 | 6 |
| 6 | 0.005 | (a) | 0.013 | B | ___do___ | C₅H₁₂ | 92 | 130 | 0.5 | 98 | 98 | 65 | 14 | 21 |
| 7 [2] | | | | | | φCH₃ | 84 | 135 | 16 | 57 | | trace | 96 | ~4 |
| 8 | 0.005 | (a) | 0.015 | Al | Ethyl | C₅H₁₂ | 80 | 130 | 8 | 98 | 93 | 83 | 11 | 7 |
| 9 | 0.005 | (b) | 0.014 | Al | ___do___ | C₅H₁₂ | 83 | 130 | 3 | 98 | 90 | 79 | 13 | 8 |
| 10 | 0.005 | (a) | 0.005 | Al | ___do___ | C₅H₁₂ | 88 | 130 | 21 | 53 | 88 | 18 | 76 | 6 |
| 11 | 0.005 | (b) | 0.015 | Al | Isobutyl | C₅H₁₂ | 92 | 130–153 | 1.0 | 97 | 95 | 65 | 24 | 11 |
| 12 | 0.015 | (b) | 0.045 | Al | n-Hexyl | C₅H₁₂ | 89 | 130–160 | 0.5 | 97 | 93 | 61 | 25 | 14 |
| 13 | 0.015 | (b) | 0.045 | Al | Isobutyl | C₅H₁₂ | 92 | 130–160 | 0.2 | 97 | 90 | 78 | 12 | 10 |
| 14 | 0.015 | (b) | 0.045 | Al | ___do___ | C₅H₁₂ | 91 | 80 | ~16 | 95 | 87 | 83 | 9 | 8 |
| 15 [3] | 0.015 | (b) | 0.045 | Al | ___do___ | C₅H₁₂ | 90 | 80 | 7 | 99 | 90 | 85 | 9 | 6 |
| 16 [4] | 0.015 | (b) | 0.043 | Al | ___do___ | C₅H₁₂ | 360 | 130 | ~1 | 89 | 92 | 75 | 16 | 9 |
| 17 | 0.005 | (c) | 0.015 | Al | Ethyl | C₅H₁₂ | 92 | 130 | 5 | 100 | 90+ | 83 | 11 | 6 |
| 18 | 0.005 | (d) | 0.016 | Al | ___do___ | C₅H₁₂ | 92 | 130 | 8.5 | 78 | | 42 | 38 | 20 |
| 19 | 0.005 | (e) | 0.016 | Al | ___do___ | φCH₃ | 80 | 130 | 14 | 100 | 87 | 38 | 55 | 7 |

[1] Catalyst not anhydrous—resulting product rubbery polymer.
[2] Uncatalyzed thermal reaction.
[3] 0.03 mol of pyridine added.
[4] Carried out in individual 4–90 gr. C₄H₈ runs using same catalyst.
(a)—2-ethylhexanoate. (b)—Acetate. (c)—Benzoate. (d)—Carbonate. (e)—Acetylacetonate.

Among the effects demonstrated, these data and the preceding examples show:

(1) Nickel salts of acidic organic compounds react with aluminum and boron organometallic compounds to yield effective butadiene cyclotrimerization catalysts. Salts of the strongly acidic organic compounds having pKa values below about 10 yield the more effective catalysts;

(2) Hydrocarbon-soluble and hydrocarbon-insoluble nickel salts of acidic organic compounds (nickel acetate, carbonate, formate, etc. are relatively insoluble, whereas nickel 2-ethylhexanoate, and the like, are soluble) are effective components for the catalyst preparation;

(3) The relative proportions of nickel salt and organometallic compound required to produce the catalyst must be in the range of one formula weight of salt per 1 to 6 mols of the organometallic compound;

(4) The catalyst of Run 16 was used consecutively in four runs using 90-gram feeds of butadiene, demonstrating prolonged catalyst life;

(5) Run 7, an uncatalyzed thermal dimerization, illustrates in comparison with the catalyzed runs, the efficacy of the catalysts;

(6) The radical of the organometallic compound may be varied over a range of hydrocarbon radical types and the upper limit in size appears to be merely a matter of practicality;

(7) Catalysts prepared from hydrocarbon-soluble nickel salts of acidic organic compounds, such as nickel 2-ethylhexanoate and the like, yielded stable solutions of sols which were especially useful, being distributed efficiently throughout the inert medium. On the other hand, the insoluble nickel salts yielded active catalysts, offering the advantages of relatively easier separation of product and catalyst desirable for continuous or repeated catalyst use as well as the preparation of inertly supported catalysts for fixed-bed or slurry continuous process use, including pelleted insoluble nickel salts per se employed in the dual capacity as support and catalyst element.

EXAMPLE 8

Example 7 was repeated, except that a $C_4$ butadiene containing feed obtained by a catalytic dehydrogenation of a mixed butene-butane hydrocarbon mixture was used. The feed composition was:

| | |
|---|---|
| 1,3-butadiene, percent | 12 |
| Mixed butenes, percent | 50 |
| Mixed butanes, percent | 38 |

After three hours, at 100–125° C., the reaction was stopped. Thirty-three percent was converted to product, of which 61% was 1,5,9-cyclododecatrienes.

These data indicate the new catalyst is effective in the presence of monoolefinic contaminants for the trimerization of crude butadiene containing hydrocarbon feeds eliminating any necessity for difficult purification and separations of butadiene from butenes. Separation of the trimer and recycle of $C_4$ hydrocarbons to a butadiene generating dehydrogenation unit follows as a routine operation. An analogous lack of polymerization activity of the present catalyst toward butenes was also experienced toward ethene and propene.

EXAMPLE 9

As in Example 7, 0.005 formula weights of nickel 2-ethylhexanoate, 0.016 mol of triethyl aluminum, and 10 ml. of pentane were placed in the rocker bomb, after which 102.6 g. (1.5 mols) of isoprene was introduced. Under autogenous pressure the bomb and contents were heated to 130° C. and maintained at this temperature for 17 hours. The estimated conversion of isoprene was about 56% with the steam distillable product indicating a catalyst selectivity as determined by gas-liquid chromatography as follows:

| | Percent |
|---|---|
| Cyclotrimer | ~14–22 |
| Dimer | 78 |

This invention has been described with particular reference to preferred embodiments thereof; nevertheless, it will be understood that variations in these embodiments can be effected without departing from the inventive concept.

I claim:
1. Process for the production of 1,5,9-cyclododecatrienes which comprises contacting in the presence of an inert liquid diluent at a temperature in the range 0°–200° C. under autogenous pressure acyclic 1,3-conjugated diene hydrocarbons having from 4–10 carbon atoms per molecule in the presence of the catalyst consisting essentially of the reaction product obtained by reacting
    (a) one formula weight of a nickel salt of an acidic organic compound having a pKa in the range from about 1–20, containing in an unreactive carbon skeleton from 1–25 carbon atoms and from 1–2 acidic hydrogen atoms per molecule and only carbon, hydrogen, and oxygen, and
    (b) from 1–6 mols of a compound of the general formula
$$MR_3$$
wherein M is selected from the group consisting of aluminum and boron and R is selected from the group consisting of hydrogen and hydrocarbon radicals having from 1–8 inclusive carbon atoms per radical group and wherein at least one of said R groups is a hydrocarbon radical,
and recovering the corresponding 1,5,9-cyclododecatriene.

2. The process of claim 1 wherein one formula weight of said nickel salt is reacted with 2.5–4.5 mols of said $MR_3$ compound, from about 0.1 to 10 parts of the resulting catalyst is present for each 100 parts of inert diluent and said contacting is at a temperature in the range 75–150° C.

3. The process of claim 1 wherein said catalyst is prepared in the absence of a diluent.

4. The process of claim 1 wherein said salt is hydrocarbon soluble.

5. Process for the production of 1,5,9-cyclododecatrienes which comprises contacting in the presence of an inert liquid diluent at a temperature in the range 0°–200° C. under autogenous pressure acyclic 1,3-conjugated diene hydrocarbons having from 4–10 carbon atoms per molecule in the presence of the catalyst consisting essentially of the reaction product obtained by reacting
    (a) one formula weight of a nickel salt of a monobasic organic carboxylic acid having a pKa in the range from about 1–8, containing in an unreactive carbon skeleton from 1–25 carbon atoms and only carbon, hydrogen, and oxygen, and
    (b) from 1–6 mols of a compound of the general formula
$$MR_3$$
wherein M is selected from the group consisting of aluminum and boron and R is a hydrocarbon radical selected from the group of alkyl, aryl, cycloalkyl, and aralkyl radicals having from 1 to 8 carbon atoms per radical inclusive.

6. The process of claim 5 wherein one formula weight of said nickel salt is reacted with 2.5–4.5 mols of a trialkyl aluminum compound having from 1 to 8 inclusive carbon atoms per alkyl group, from about 0.1 to 10 parts of the resulting catalyst is present for each 100 parts of inert diluent and said contacting is at a temperature in the range 75–150° C.

7. The process of claim 6 wherein said salt is hydrocarbon soluble.

References Cited by the Examiner

FOREIGN PATENTS 219,580   2/1962   Austria.

DELBERT E. GANTZ, *Primary Examiner.*

ALPHONSO D. SULLIVAN, *Examiner.*